(12) United States Patent
Weissman

(10) Patent No.: US 7,879,240 B2
(45) Date of Patent: Feb. 1, 2011

(54) METHOD AND SYSTEM FOR AERATING WASTEWATER FOR RE-USE

(76) Inventor: Jeremy Weissman, 117 Hefer Road, ShaAr Hefer (IL) 42920

( * ) Notice: Subject to any disclaimer, the term of this patent is extended or adjusted under 35 U.S.C. 154(b) by 662 days.

(21) Appl. No.: 11/884,683

(22) PCT Filed: Feb. 22, 2006

(86) PCT No.: PCT/IL2006/000242

§ 371 (c)(1),
(2), (4) Date: Aug. 20, 2007

(87) PCT Pub. No.: WO2006/090382

PCT Pub. Date: Aug. 31, 2006

(65) Prior Publication Data

US 2008/0251453 A1    Oct. 16, 2008

Related U.S. Application Data

(60) Provisional application No. 60/655,033, filed on Feb. 22, 2005.

(51) Int. Cl.
*C02F 3/00* (2006.01)

(52) U.S. Cl. .................. 210/620; 210/621; 210/744; 210/150; 210/151; 210/220; 210/247

(58) Field of Classification Search .............. 210/620, 210/621, 744, 150–151, 220, 247
See application file for complete search history.

(56) References Cited

U.S. PATENT DOCUMENTS

| | | | |
|---|---|---|---|
| 5,096,596 A | | 3/1992 | Hellenbrand et al. |
| 5,169,567 A | * | 12/1992 | Daugherty et al. ............. 261/30 |
| 6,787,036 B2 | * | 9/2004 | Long ........................ 210/629 |
| 7,387,733 B2 | * | 6/2008 | Baskis et al. ................ 210/605 |

OTHER PUBLICATIONS

International Search Report and the Written Opinion Dated Oct. 24, 2006 From the International Searching Authority Re.: Application No. PCT/IL06/00242.

Examiner's Report Dated Jun. 9, 2010 From the Australian Government, IP Australia Re. Application No. 2006217459.

* cited by examiner

*Primary Examiner*—Chester T Barry

(57) ABSTRACT

A method and apparatus for aerating a liquid, particularly for aerating water in a wastewater treatment process, by: introducing the liquid into a primary pressurizable aeration tank; pumping liquid from the primary pressurizable aeration tank into a secondary pressurizable aeration chamber via a feed path; aerating the liquid in the secondary pressurizable aeration chamber; and recirculating aerated liquid from the secondary pressurizable aeration chamber back to the primary pressurizable aeration tank via a return path. The return path has a cross-sectional area smaller than that of the feed path through which the liquid is pumped into the secondary pressurizable aeration chamber such as to pressurize the secondary pressurizable aeration chamber to a pressure greater than that in the primary pressurizable aeration tank, and thereby (a) to enhance the aeration of the liquid in the secondary pressurizable aeration chamber, and (b) to supply the energy for recirculating the aerated liquid back to the primary pressurizable aeration tank.

44 Claims, 3 Drawing Sheets

METHOD AND SYSTEM FOR AERATING WASTEWATER FOR RE-USE

RELATED APPLICATIONS

This Application is a National Phase of PCT Patent Application No. PCT/IL2006/000242 having International Filing Date of Feb. 22, 2006, which claims the benefit of U.S. Provisional Patent Application No. 60/655,033 filed on Feb. 22, 2005. The contents of the above Applications are all incorporated herein by reference.

FIELD AND BACKGROUND OF THE INVENTION

The present invention relates to a method of aerating a liquid. The invention is particularly useful for aerating wastewater in the treatment of the wastewater for re-use, and is therefore described below with respect to such an application.

The activated sludge process of wastewater treatment is an aerobic, suspended-growth, process that maintains a relatively high population of microorganisms (biomass) by recycling settled biomass back to the treatment process. The biomass converts soluble and colloidal biodegradable organic matter and some inorganic compounds into cell mass and metabolic end products. The biomass is separated from the wastewater through settling in a settling tank, or clarifier, for recycling or wasting to sludge handling processes.

Preliminary treatment to remove settleable solids and floatable materials is usually provided by a septic tank or other primary treatment device. Most onsite designs are capable of providing significant ammonia oxidation and effective removal of organic matter.

A basic system consists typically of the following interrelated components:

1. an aeration tank or basin;
2. an oxygen source and equipment to disperse atmospheric or pressurized air or oxygen into the aeration tank at a rate sufficient to always maintain positive dissolved oxygen;
3. a means to appropriately mix the aeration basin and ensure suspension of the biomass (usually accomplished by the aeration system); and
4. a settling tank or clarifier to separate the biomass from the treated effluent and collect settled biomass for recycling to the aeration basin.

However, in the existing wastewater treating systems the amount of oxygen capable of being dissolved in the water is limited, thus limiting the biomass growth and the capacity and rate of wastewater treatment.

A number of techniques have been proposed in the patent literature for increasing the amount of oxygen dissolved in the wastewater being treated in order to enhance the biomass growth. For example, U.S. Pat. No. 6,153,099 describes an apparatus including a series of open vessels each equipped with a nozzle for discharging a spray of the wastewater into the respective vessel. U.S. Pat. Nos. 4,274,959 and 4,369,111 describe systems including pressurized containers for aerating the wastewater.

OBJECTS AND BRIEF SUMMARY OF THE PRESENT INVENTION

An object of the present invention is to provide a novel method and system for the aeration of a liquid having a number of advantages, as will be described more particularly below. Another object of the invention is to provide a method and system particularly useful for the onsite treatment of wastewater in residential and small commercial applications. A more particular object of the invention is to provide a method and system which enhances the aeration capability of the liquid being treated, and also enables the installation cost of such a system to be substantially reduced.

According to one aspect of the present invention, there is provided a method of aerating a liquid comprising introducing the liquid into a primary pressurizable aeration tank; pumping liquid from the primary pressurizable aeration tank into a secondary pressurizable aeration chamber; aerating the liquid in the secondary pressurizable aeration chamber; and recirculating aerated liquid from the secondary pressurizable aeration chamber back to the primary pressurizable aeration tank.

According to a particularly important feature in the preferred embodiment of the invention described below, the return path through which aerated liquid is circulated back to the primary pressurizable aeration tank has a cross-sectional area smaller than that of the feed path through which the liquid is pumped into the secondary pressurizable aeration chamber such as to pressurize the secondary pressurizable aeration chamber to a pressure greater than that in the primary pressurizable aeration tank, and thereby (a) to enhance the aeration of the liquid in the secondary pressurizable aeration chamber, and (b) to supply the energy for recirculating the aerated liquid back to the primary pressurizable aeration tank.

According to a still further in the described preferred embodiment, the liquid is pumped into the secondary pressurizable aeration chamber and recirculated back to the primary pressurizable aeration tank at a rate to change the volume of the secondary pressurizable aeration chamber a plurality of times per hour.

According to a still further feature in the described preferred embodiment, the liquid in the secondary pressurizable aeration chamber is aerated by introducing compressed air into the secondary pressurizable aeration chamber to produce an atmosphere of compressed air therein; pumping liquid into the atmosphere of compressed air in the secondary pressurizable aeration chamber; and atomizing the liquid pumped into the atmosphere of compressed air in the secondary pressurizable aeration chamber. The liquid pumped into the atmosphere of compressed air in the secondary pressurizable aeration chamber is atomized by directing the liquid against a splatter plate. The splatter plate is of an inverted-V configuration having a pair of sides converging towards an apex, and the liquid is directed against the inner surface of one side of the splatter plate towards the apex.

According to another aspect of the present invention, there is provided a system for aerating a liquid comprising: a primary pressurizable aeration tank; a secondary pressurizable aeration chamber; an aerator for aerating the liquid in the secondary pressurizable aeration chamber; a pump for pumping liquid from the primary pressurizable aeration tank via a feed path to the secondary pressurizable aeration chamber; and a return path for recirculating aerated liquid from the secondary pressurizable aeration chamber back to the primary pressurizable aeration tank.

As indicated above, the invention is particularly useful in aerating wastewater as part of a treatment of wastewater for re-use. As will be described more particularly below, the method and system including the foregoing features are capable of substantially enhancing the aeration of the liquid being treated while reducing the installation cost for the system, thereby making the system particularly useful for onsite wastewater treatment in residential or small commercial units.

Further features and advantages of the invention will be apparent from the description below.

BRIEF DESCRIPTION OF THE DRAWINGS

The invention is herein described, by way of example only, with reference to the accompanying drawings, wherein.

It is to be understood that the foregoing drawings, and the description below, are provided primarily for purposes of facilitating understanding the conceptual aspects of the invention and possible embodiments thereof, including what is presently considered to be a preferred embodiment. In the interest of clarity and brevity, no attempt is made to provide more details than necessary to enable one skilled in the art, using routine skill and design, to understand and practice the described invention. It is to be further understood that the embodiments described are for purposes of example only, and that the invention is capable of being embodied in other forms and applications than described herein.

DESCRIPTION OF PREFERRED EMBODIMENTS

Overall System

As indicated earlier, the system illustrated in the accompanying drawings as a preferred embodiment of the present invention is particularly useful as an onsite wastewater treatment system for use in residential and small commercial applications, since such a system can be built in a relatively compact manner at a relatively low cost. For example, the illustrated system can be constructed to process from 1-15 cubic meters (250-3750 gallons) of wastewater per day for re-use, e.g. for irrigation purposes. It therefore is particularly suitable for rural areas or places without central sewage systems.

Figure 1:
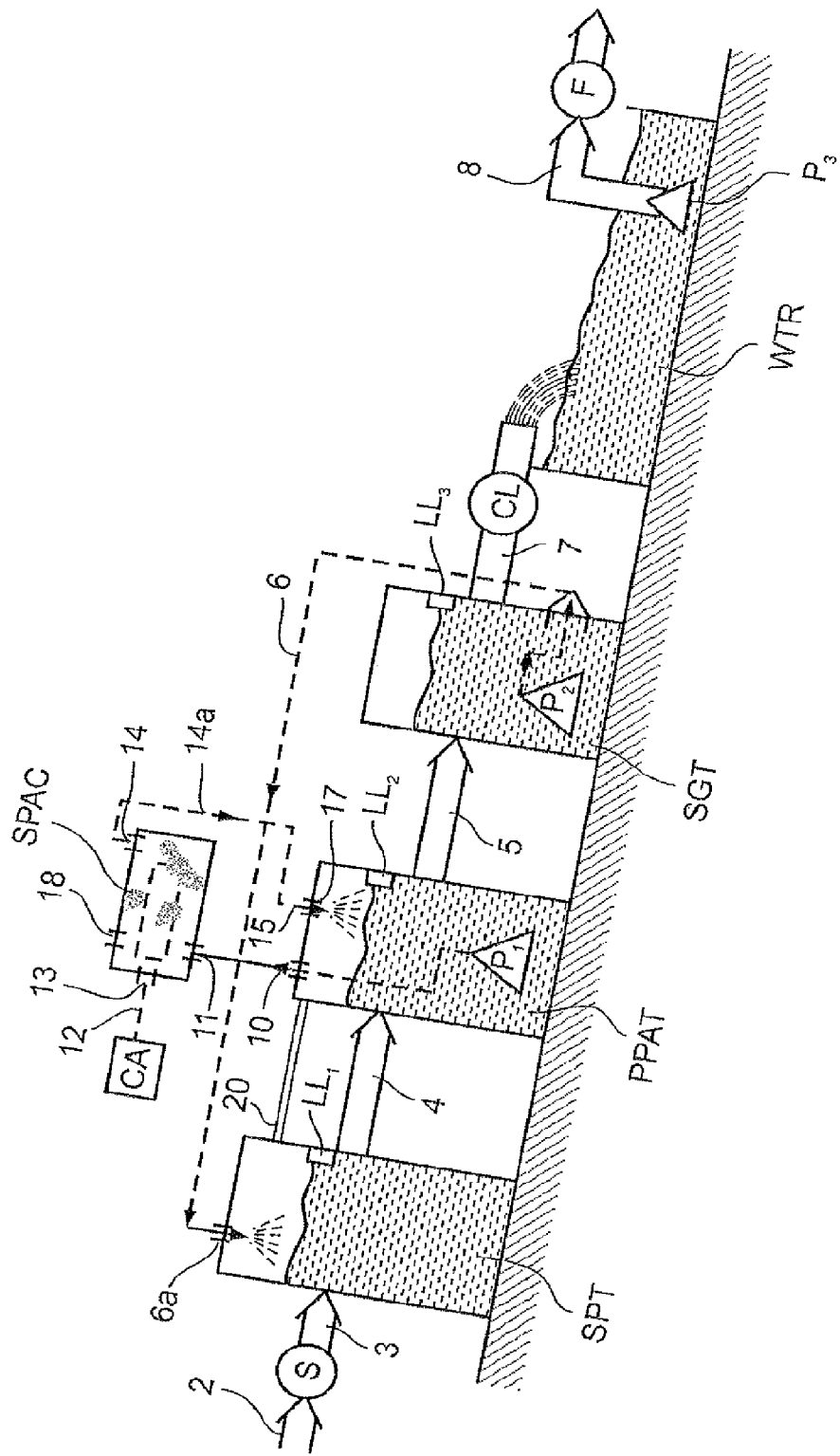
FIG. 1 is a diagram illustrating one form of system constructed in accordance with the present invention for treating wastewater in order to permit its re-use, e.g. for irrigation purposes.

In the system illustrated in FIG. 1, the wastewater to be treated is applied via an inlet conduit 2, a screen S, and a conduit 3, to a conventional septic tank SPT. From the latter tank, the wastewater flows via conduit 4 into a primary pressurizable aeration tank PPAT, a portion of which is pumped by a pump $P_1$ to a secondary pressurizable aeration chamber SPAC As will be described more particularly below, chamber SPAC aerates the wastewater such as to achieve a high level of dissolved oxygen, e.g. 4-6 p.p.m. The manner in which this high level of aeration or oxygenation of the waste water is achieved with the secondary pressurizable aeration chamber SPAC is described below particularly with respect to FIGS. 2-6. The high level of oxygenation or aeration so obtained enables the various bacteria to digest the organic and purify the wastewater.

The aerated wastewater in tank PPAT is fed via conduit 5 to a settling tank or clarifier SGT, which allows suspended solid particles to settle out and sink to the bottom of the tank. The settling tank SGT includes a second pump $P_2$ which pumps out the solids settling at the bottom of the tank via conduit 6 back to the septic tank SPT for recirculation via conduit 4 to tank PPAT. As will be described below, this recirculation of the solids and a part of the liquid from the bottom of the settling tank SGT back to the top of the septic tank SPT reduces the solid content of, more uniformly homogenizes the liquid content of, and denitrifies, the wastewater fed to tank PPAT.

The wastewater from the settling tank SGT is fed via a conduit 7 through a chlorinator CL to a water reservoir WTR which may be an open basin or the like for storing the treated wastewater before re-use. As indicated above, the so-treated waste water may be reused for irrigation purposes. Water reservoir WTR includes an additional pump $P_3$ for pumping out the water on demand, via a conduit 8 and a filter F.

As indicated in FIG. 1, the above-described components of the system are supported on a slope so as to produce a gravity-feed of the wastewater from one tank to the next. Preferably, each of the tanks in the system includes a liquid level sensor, as indicated by liquid level sensors $LL_1$, $LL_2$, $LL_3$, respectively, to maintain the liquid in each tank at a level about two-thirds of the height of the tank, such that each tank includes an air layer or region above the liquid in the respective tank.

Aeration Process

As indicated above, the aeration process is effected in the primary pressurizable aeration tank and the secondary pressurizable aeration chamber by the operation of pump $P_1$ in tank PPAT. Thus, as shown in FIG. 1, chamber SPAC is located a higher elevation than tank PPAT, e.g. by mounting it at or above the upper end of the latter tank. Pump $P_1$ pumps wastewater from the lower end of tank PPAT via a pipe 10 to the inlet conduit 11 at the bottom of chamber SPAC. An atmosphere of pressurized air is produced in the interior of the SPAC by means of a source of compressed air CA connected via a conduit 12 to an air inlet port 13. As will be described below particularly with respect to FIGS. 2-6, the wastewater pumped by pump $P_1$ is atomized within the atmosphere of compressed air within the secondary pressurizable aeration chamber SPAC so as to produce a high level of water aeration within chamber SPAC. The highly-aerated water produced within chamber SPAC is recirculated back via a return conduit 14a leading from the outlet port 14 of chamber SPAC to an inlet port 15 at the top of tank PPAT. This recirculation of the aerated water is effected at a rate to change the volume of chamber SPAC a plurality of times per hour, preferably from 5-7 times per hour, such that the water in tank PPAT is fully aerated with a long retention time.

FIGS. 2-6 more particularly illustrate the construction of the secondary pressurizable aeration chamber SPAC which, as indicated above, produces a high rate of aeration of the water in the primary pressurizable aeration tank. Thus, as shown in FIGS. 2-6, chamber SPAC is in the form of a cylindrical tank, including an inlet port 11 at the bottom of one end, and an outlet port 14 at the top of the opposite end. As indicated earlier, inlet port 11 is coupled to pump $P_1$ in tank PPAT by a feed conduit 10; and the outlet port 14 is coupled to inlet port 15 at the top of tank PPAT via a return conduit 14a for recirculating the aerated water back to the latter tank.

Figure 3:
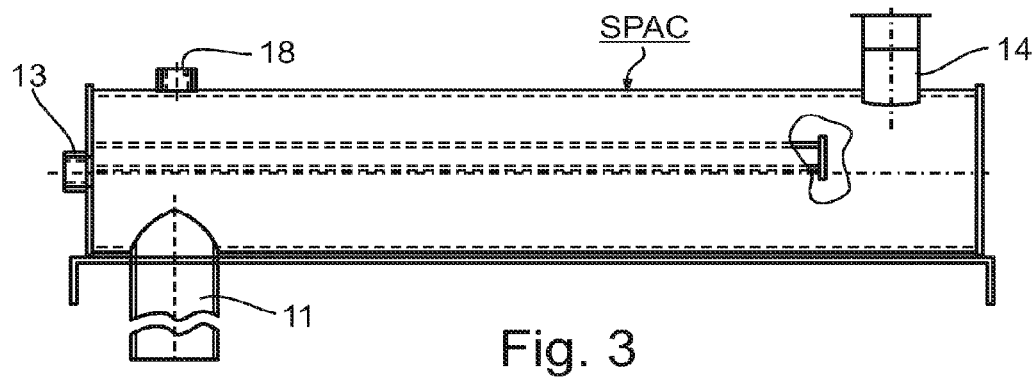

As can be seen particularly in FIG. 3, the return path including the outlet port 14 of chamber SPAC is of smaller cross-sectional area than the feed path including the inlet port 11. Accordingly, the outlet port 14 acts as a restrictor for restricting the flow of the aerated water via return conduit 14a back to tank PPAT, such that the pressure within chamber SPAC will be higher than that within tank PPAT. A high pressure within chamber SPAC produces two advantageous results: (1) first, it enhances the aeration of the wastewater in chamber SPAC; and (2) it supplies the energy for recirculating the aerated water back via outlet port 14 and return conduit 14a to tank PPAT, so that a separate pump is not necessary for this purpose.

Figure 4:
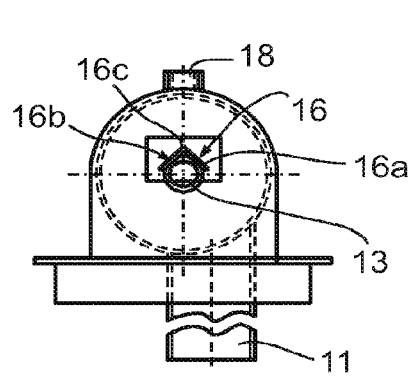
FIGS. 4, 5 and 6 are opposite end views and a top view, respectively, of the secondary pressurizable aeration chamber of FIGS. 2 and 3.
Figure 5:
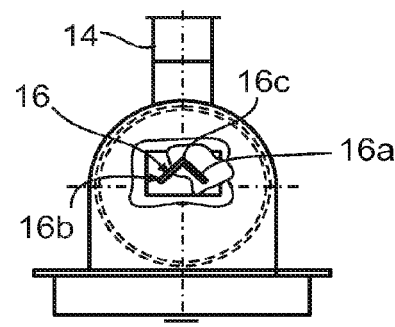
Figure 6:
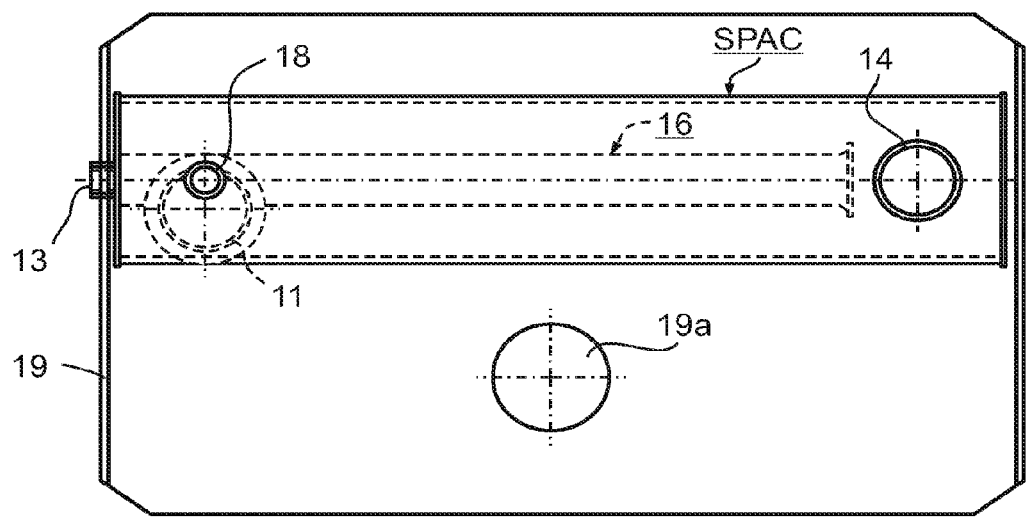

As indicated above, the water pumped into the compressed air atmosphere within the secondary pressurizable aeration chamber SPAC is atomized so as to further enhance the aeration of the water. The atomization of the water in chamber SPAC is effected by a splatter plate 16 mounted within chamber SPAC so as to be impinged by the water pumped into that chamber via the inlet port 11. Thus, as shown in FIGS. 4 and 5, splatter plate 16 is of inverted-V configuration, having two sides 16a, 16b open towards the inlet port 11 and converging towards the apex 16c. As further shown particularly in FIG. 4, the V-shaped splatter plate 16 extends parallel to the longitudinal axis of chamber SPAC, but the inlet port 11 is located eccentrically with respect to the axis of the latter chamber. Thus, the wastewater inletted via feed conduit 10 and inlet port 11 is directed as a jet against the inner surface of side 16a of the V-shaped splatter plate 16, towards its apex 16c.

Such an arrangement causes the jet of wastewater inletted via port 11 to become highly atomized when impinging splatter plate 16, and to attain a high level of aeration by the compressed air atmosphere within which the splattering action is produced. This high level of aeration of the waste water within the secondary pressurizable aeration chamber, and the recirculation of the aerated water via return conduit 14 back to the primary pressurizable aeration tank (preferably about 5-7 times per hour), produces a high level of aeration of the wastewater outletted from the primary pressurizable aeration tank via conduit 5 to the settling tank SGT.

The aerated water outletted via port 14 at the upper end of chamber SPAC is inletted via return conduit 14a to the upper end of tank PPAT via a nozzle 17 such as to further atomize this aerated water within the upper air region in that tank.

Figure 2:
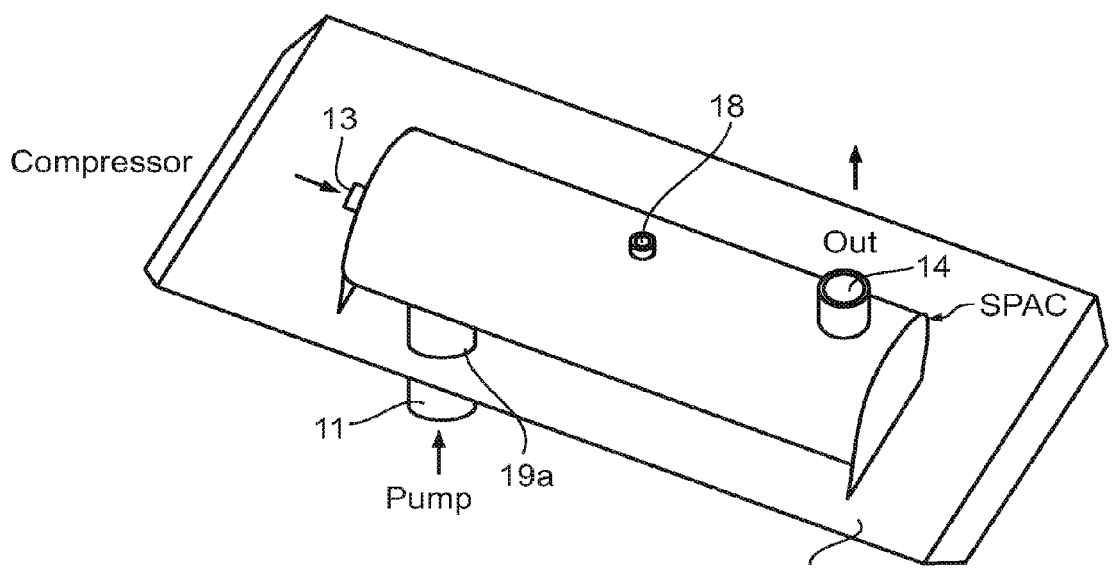
FIGS. 2 and 3 are isometric and side views, respectively, of the secondary pressurizable aeration chamber in the system of FIG. 1 which cooperates with the primary pressurizable aeration tank in that system to enhance the aeration of the water.

As shown in FIG. 2, for example, chamber SPAC includes a small outlet port 18 at the upper end thereof, opposite to its outlet port 14, to enable extracting samples of the air aerated with in the secondary pressurizable aeration chamber for testing purposes whenever desired. Chamber SPAC is mounted in any suitable manner to a mounting plate 19 formed with an opening 19a for the feed conduit 11.

Recirculation from Settling Tank SGT to Septic Tank SPT

As indicated earlier, pump $P_2$ within the settling tank SGT circulates a portion of the water and most or all of the solid content therein from the bottom of the latter tank to the upper end of the septic tank SPT via conduit 6. This circulated water is preferably fed to the upper air region within the septic tank SPT via a nozzle 6a. This recirculation of a portion of the water from the settling tank to the septic tank produces a number of advantages: (1) it tends to reduce the solid content of the wastewater within the septic tank; (2) it tends to homogenize the liquid content of the wastewater within that tank; (3) and, by adding oxygen to the wastewater within the septic tank, it tends to denitrify the wastewater within the septic tank and to reduce, or to eliminate, the odors thereof. As shown in FIG. 1, a small tube 20 connects the air region in tank SPT to the air region in tank PPAT to prevent the accumulation of gases, e.g., methane, $SO_2$, etc., within tank PPAT.

Overall Operation

The operation of the system illustrated in the drawings will be apparent from the above description. Thus, the wastewater to be treated is inputted via inlet conduit 2, screen S, and conduit 3, into the septic tank SPT, and is maintained at a predetermined level therein (e.g., two-thirds full) by liquid level sensor $LL_1$. In the illustrated preferred embodiment, the various tanks of the system are on a slope of decreasing elevation, such that the flow from one tank to the next is effected by gravity.

The wastewater is outputted from the septic tank SPT via conduit 4 into the primary pressurizable aeration tank PPAT, wherein it is maintained at the predetermined level by liquid level sensor $LL_2$. Pump $P_1$ in the latter tank pumps the liquid from the bottom of the tank through feed conduit 10 and inlet port 11 into the secondary pressurizable aeration chamber SPAC. An atmosphere of compressed air is maintained within that chamber by the compressed air source CA via conduit 12 and the inlet 13. The wastewater pumped by pump $P_1$ into the interior of chamber SPAC is directed against the inner face of one side 16a of the splatter plate 16 within chamber SPAC towards its apex 16c, such that the inletted water is splattered into finely atomized droplets within the pressured-air atmosphere in that chamber. The so-aerated droplets are recirculated, via outlet port 14 and return conduit 14a back to the upper end of tank PPAT and are discharged into the air region within that tank via nozzle 17, so as to further aerate the wastewater. As indicated above, this process of pumping into chamber SPAC and recirculating the aerated water back into the air region of tank PPAT is effected at a rate to change the volume of chamber SPAC several times per hour, preferably about 5-7 times per hour. In this manner, the water in tank PPAT is aerated to a very high level.

As indicated above, the return path of the aerated water, including the outlet port 14 and return duct 14a, from chamber SPAC to tank PPAT is of smaller cross-sectional area than the feed path, including conduit 10 and inlet port 11, from the pump $P_1$ into the interior of chamber SPAC. Accordingly, the pressure within chamber SPAC is higher than that within tank PPAT, which thereby not only supplies the energy for pumping the aerated water from chamber SPAC to tank PPAT, but also enhances the aeration of the water within chamber SPAC.

The so-aerated wastewater is outletted from the primary pressurizable aeration tank via conduit 5 into the settling tank SGT. Settling tank SCT allows the remaining suspended particles to settle out. Particles which sink to the bottom of the tank are pumped by pump $P_2$ and conduit 6 back to the upper end of the septic tank SPT and discharged via nozzle 6a in the air region at the upper end of the tank. As indicated earlier, this produces a number of advantages, in that it reduces the solid content of, homogenizes the liquid content of, and nitrifies, the wastewater within the septic tank. The result is a reduction in the solid content of the water within the settling tank SGT and also a reduction in, or elimination of, the odors emanating from the septic tank.

The water is drawn from the settling tank SGT at an upper level thereof through a chlorinator CL to the water reservoir WTR, where it may be stored for use as required. The water within the reservoir WTR may be between 95% and 98% clean, compared to normal septic system water which is approximately 60% clean. Such water from the reservoir may be used for sub-surface drip irrigation, or for an absorption drain field, in which case no further treatment is normally required. If the water in the reservoir is used for surface irrigation, or where human contact is possible, the water may be subjected to a disinfection treatment, e.g. by chlorination. Pump $P_3$ may be used for pumping water out from the outlet conduit 8 through filter F upon demand, or could be outletted from the reservoir by gravity feed. Such a system has been found to be sufficiently environmental-friendly with respect to ground-water contamination, odors, and the like, such that it can be installed relatively close to residential buildings.

While the invention has been described with respect to one preferred embodiment for treating wastewater for re-use, it will be appreciated that the invention could be used in other applications, for example for aeration of bodies of water, e.g. lakes, ponds, pools, etc., in order to promote animal growth therein, or to reduce growth of algae or other undesirable aquatic biota.

Many other variations, modifications and applications of the invention will be apparent.

What is claimed is:

1. A method of aerating a liquid comprising:
   introducing the liquid into a primary pressurizable aeration tank;
   pumping liquid from said primary pressurizable aeration tank into a secondary pressurizable aeration chamber;
   aerating the liquid in the secondary pressurizable aeration chamber; and
   recirculating aerated liquid from said secondary pressurizable aeration chamber back to said primary pressurizable aeration tank.

2. The method according to claim 1, wherein said aerated liquid is circulated back to said primary pressurizable aeration tank via a return path which has a cross-sectional area smaller than that of the feed path through which the liquid is pumped into said secondary pressurizable aeration chamber such as to pressurize said secondary pressurizable aeration chamber to a pressure greater than that in said primary pressurizable aeration tank, and thereby (a) to enhance the aeration of said liquid in the secondary pressurizable aeration chamber, and (b) to supply the energy for recirculating the aerated liquid back to the primary pressurizable aeration tank.

3. The method according to claim 1, wherein said liquid is pumped into said secondary pressurizable aeration chamber and recirculated back to said primary pressurizable aeration tank at a rate to change the volume of said secondary pressurizable aeration chamber a plurality of times per hour.

4. The method according to claim 1, wherein the liquid in the secondary pressurizable aeration chamber is aerated by:
   introducing compressed air into said secondary pressurizable aeration chamber to produce an atmosphere of compressed air therein;
   pumping liquid into said atmosphere of compressed air in said secondary pressurizable aeration chamber;
   and atomizing the liquid pumped into said atmosphere of compressed air in said secondary pressurizable aeration chamber.

5. The method according to claim 4, wherein the liquid pumped into said atmosphere of compressed air in said secondary pressurizable aeration chamber is atomized by directing a jet of the liquid against a splatter plate.

6. The method according to claim 5, wherein said splatter plate is of an inverted-V configuration having a pair of sides converging towards an apex, and said liquid is directed as a jet against the inner surface of one side of said splatter plate towards said apex.

7. The method according to claim 4,
   wherein the level of liquid in said primary pressurizable aeration tank is controlled to maintain a pressurized air region at the upper end thereof;
   and wherein the liquid circulated from said secondary pressurizable aeration chamber back to said primary pressurizable aeration tank is atomized in said pressurized air region of said primary pressurizable aeration tank to further enhance the aeration thereof.

8. The method according to claim 1, wherein said secondary pressurizable aeration chamber is defined by a cylindrical tank at a higher elevation than said primary pressurizable aeration tank.

9. The method according to claim 1, wherein said liquid is wastewater to be aerated as part of a treatment for re-use of the wastewater.

10. The method according to claim 9, wherein said wastewater is pumped into said secondary pressurizable aeration chamber and is recirculated back to said primary pressurizable aeration tank at a rate to change the volume of said secondary pressurizable aeration chamber a plurality of times per hour.

11. The method according to claim 9, wherein said wastewater is pumped into said secondary pressurizable aeration chamber and is recirculated back to said primary pressurizable aeration tank at a rate to change the volume of said secondary pressurizable aeration chamber at least five times per hour.

12. The method according to claim 10, wherein said wastewater is introduced from a septic tank into said primary pressurizable aeration tank, and the aerated water from said primary pressurizable aeration tank is fed to a settling tank for settling out solids therein.

13. The method according to claim 12, wherein a portion of the solids and liquids at the bottom of said settling tank is pumped back to the top of said septic tank for recirculation to said primary pressurizable aeration tank in order to reduce the solid content of, to more uniformly homogenize the liquid content of, and/or to denitrogenate the wastewater fed to said primary pressurizable aeration tank.

14. The method according to claim 12, wherein the liquid content of the settling tank is chlorinated and fed to a water reservoir for re-use.

15. The method according to claim 14, wherein said wastewater is gravity fed from said septic tank to said primary pressurizable aeration tank, to said settling tank, and to said water reservoir.

16. A method of treating wastewater for re-use, comprising aerating the wastewater by:
   introducing wastewater into a primary pressurizable aeration tank;
   pumping wastewater from said primary pressurizable aeration tank into a secondary pressurizable aeration chamber via a feed path;
   aerating the wastewater in the secondary pressurizable aeration chamber;
   and recirculating aerated water from said secondary pressurizable aeration chamber back to said primary pressurizable aeration tank via a return path.

17. The method according to claim 16, wherein said return path through which aerated wastewater is circulated back to said primary pressurizable aeration tank has a cross-sectional area smaller than that of the feed path through which the wastewater is pumped into said secondary pressurizable aeration chamber such as to pressurize said secondary pressurizable aeration chamber to a pressure greater than that in said primary pressurizable aeration tank, and thereby (a) to enhance the aeration of said wastewater in the secondary pressurizable aeration chamber, and (b) to supply the energy for recirculating the aerated wastewater back to the primary pressurizable aeration tank.

18. The method according to claim 16, wherein said aerated water is recirculated back to said primary pressurizable aeration tank at a rate to change the volume of said secondary pressurizable aeration chamber at least five times per hour.

19. The method according to claim 16, wherein the wastewater in the secondary pressurizable aeration chamber is aerated by:
  introducing compressed air into said secondary pressurizable aeration chamber to produce an atmosphere of compressed air therein;
  pumping wastewater into said atmosphere of compressed air in said secondary pressurizable aeration chamber;
  and atomizing the wastewater pumped into said atmosphere of compressed air in said secondary pressurizable aeration chamber.

20. The method according to claim 19, wherein the wastewater pumped into said atmosphere of compressed air in said secondary pressurizable aeration chamber is atomized by directing the wastewater as a jet against a splatter plate.

21. The method according to claim 20, wherein said splatter plate is of an inverted-V configuration including a pair of sides converging towards an apex, and said wastewater is directed as a jet against the inner surface of one side of said splatter plate towards said apex.

22. The method according to claim 19,
  wherein the level of wastewater in said primary pressurizable aeration tank is controlled to maintain a pressurized air region at the upper end thereof;
  and wherein the aerated water circulated from said secondary pressurizable aeration chamber back to said primary pressurizable aeration tank is atomized in said pressurized air region of said primary pressurizable aeration tank to further enhance the aeration thereof.

23. The method according to claim 16, wherein said secondary pressurizable aeration chamber is defined by a cylindrical tank at a higher elevation than at said primary pressurizable aeration tank.

24. The method according to claim 16, wherein said method further comprises:
  introducing said wastewater from a septic tank into said primary pressurizable aeration tank; and
  feeding the aerated water from said primary pressurizable aeration tank to a settling tank in which solids tend to settle out from liquids therein.

25. The method according to claim 24, wherein a portion of the solids and liquids at the bottom of said settling tank is pumped back to the top of said septic tank for recirculation to said primary pressurizable aeration tank in order to reduce the solid content of, and to more uniformly homogenize the liquid content of, and/or to denitrogenate, the wastewater fed to said primary pressurizable aeration tank.

26. The method according to claim 24, wherein the liquid content of the settling tank is chlorinated and fed to a water reservoir for re-use.

27. The method according to claim 24, wherein said wastewater is gravity fed from said septic tank to said primary pressurizable aeration tank, to said settling tank, and to said water reservoir.

28. A system for aerating a liquid comprising:
  a primary pressurizable aeration tank;
  a secondary pressurizable aeration chamber;
  an aerator for aerating the liquid in said secondary pressurizable aeration chamber;
  a pump for pumping liquid from said primary pressurizable aeration tank via a feed path to said secondary pressurizable aeration chamber;
  and a return path for recirculating aerated liquid from said secondary pressurizable aeration chamber back to said primary pressurizable aeration tank.

29. The system according to claim 28, wherein said return path through which aerated liquid is circulated back to said primary pressurizable aeration tank has a cross-sectional area smaller than that of the feed path through which the liquid is pumped into said secondary pressurizable aeration chamber such as to pressurize said secondary pressurizable aeration chamber to a pressure greater than that in said primary pressurizable aeration tank, and thereby (a) to enhance the aeration of said liquid in the secondary pressurizable aeration chamber, and (b) to supply the energy for recirculating the aerated liquid back to the primary pressurizable aeration tank.

30. The system according to claim 28, wherein said liquid is pumped into said secondary pressurizable aeration chamber and recirculated back to said primary pressurizable aeration tank at a rate to change the volume of said secondary pressurizable aeration chamber a plurality of times per hour.

31. The system according to claim 28, wherein said aerator for aerating the liquid in the secondary pressurizable aeration chamber comprises:
  a source of compressed air for introducing compressed air into said secondary pressurizable aeration chamber to produce an atmosphere of compressed air therein;
  and an atomizer in said secondary pressurizable aeration chamber for atomizing the liquid pumped into said atmosphere of compressed in said secondary pressurizable aeration chamber.

32. The system according to claim 31, wherein said atomizer comprises a splatter plate in said atmosphere of compressed air in said secondary pressurizable aeration chamber against which the pumped liquid is directed.

33. The system according to claim 32, wherein said splatter plate is of an inverted-V configuration including a pair of sides converging towards an apex, said pumped liquid being directed as a jet against the inner surface of one side of said splatter plate towards said apex.

34. The system according to claim 28,
  wherein said primary pressurizable aeration tank includes a liquid level control to maintain a pressurized air region at the upper end of said tank;
  and wherein said return conduit for circulating agitated liquid from said secondary pressurizable aeration chamber back to said primary pressurizable aeration tank includes an atomizer for atomizing said aerated liquid in said pressurized air region to further enhance the aeration thereof.

35. The system according to claim 28, wherein said secondary pressurizable aeration chamber is defined by a cylindrical tank at a higher elevation at said primary pressurizable aeration tank.

36. The system according to claim 28,
  wherein said liquid is wastewater to be aerated as part of a treatment of re-use of the wastewater;
  and wherein said pump pumps said wastewater into said secondary pressurizable aeration chamber at a rate to change the volume of said secondary pressurizable aeration chamber a plurality of times per hour.

37. The system according to claim 28, wherein said system further comprises:
  a septic tank from which said wastewater is introduced into said primary pressurizable aeration tank; and
  a setting tank for receiving the aerated water from said primary pressurizable aeration tank and for settling out solids therefrom.

38. The system according to claim 37, wherein said system further comprises a pump for pumping a portion of the solids and liquids at the bottom of said settling tank back to the top of said septic tank for recirculation to said primary pressurizable aeration tank, such as to reduce the solid content of, to more uniformly homogenize the liquid content of, and/or to denitrogenate, the wastewater fed from said septic tank to said primary pressurizable aeration tank.

39. The system according to claim 28, wherein system further comprises a chlorinator for chlorinating the liquid content of the settling tank outputted to a water reservoir for re-use.

40. The system according to claim 28, wherein said septic tank, said primary pressurizable aeration tank, said settling tank, and said water reservoir, are at different levels to effect a gravity feed of the wastewater through the system.

41. A method of aerating a liquid, comprising:
providing a chamber with a splatter plate of V-configuration having a pair of sides converging towards an apex;
producing in said chamber an atmosphere of compressed air;
and introducing the liquid to be aerated into said chamber in the form of a jet directed against an inner surface of one of said sides of the splatter plate and towards said apex in order to atomize the liquid in within said atmosphere of compressed air therein.

42. A system for aerating a liquid, comprising:
a chamber including a splatter plate of V-configuration having a pair of sides converging towards an apex;
a source of compressed air for producing in said chamber an atmosphere of compressed air;
and a pump for pumping the liquid to be aerated into said chamber in the form of a jet directed against an inner surface of one of said sides of the splatter plate and towards said apex in order to atomize the liquid within said atmosphere of compressed air in said chamber.

43. A method of treating wastewater for re-use, comprising:
collecting said water in a septic tank;
feeding water from said septic tank to an aerating tank for aerating said water;
feeding aerated water from said aerating tank to a settling for settling out solids at the bottom of said settling tank;
and recirculating a portion of the solids and liquid in the bottom of said settling tank back to said septic tank, in order to reduce the solid content of, to more uniformly homogenize the liquid content of, and/or to denitrogenate, the wastewater fed from said septic tank to said aeration tank.

44. A system for treating wastewater for re-use comprising:
a septic tank for collecting said wastewater;
an aerating tank coupled to said septic tank by a conduit for feeding wastewater from said septic to said aerating tank;
a settling tank coupled to said aerating tank by a conduit for feeding aerated wastewater from said aerating tank to said settling tank;
a return conduit coupling the bottom of said settling tank to the top of said septic tank;
and a pump for pumping liquid and solids from the bottom of said settling tank to the top of said septic tank in order to reduce the solid content of, to more uniformly homogenize the liquid content of, and/or to denitrogenate, the wastewater fed by said septic tank to said aerating tank.

* * * * *